United States Patent
Ericson et al.

(10) Patent No.: US 11,895,645 B2
(45) Date of Patent: Feb. 6, 2024

(54) SHARED RESOURCE CONFIGURATION FOR BANDWIDTH PARTS

(71) Applicant: Telefonaktiebolaget LM Ericsson (publ), Stockholm (SE)

(72) Inventors: Mårten Ericson, Gammelstad (SE); Jan Christoffersson, Luleå (SE); Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 432 days.

(21) Appl. No.: 17/268,547

(22) PCT Filed: Aug. 16, 2018

(86) PCT No.: PCT/IB2018/056193
§ 371 (c)(1),
(2) Date: Feb. 15, 2021

(87) PCT Pub. No.: WO2020/035718
PCT Pub. Date: Feb. 20, 2020

(65) Prior Publication Data
US 2021/0314987 A1    Oct. 7, 2021

(51) Int. Cl.
*H04W 72/0453* (2023.01)
*H04W 72/1268* (2023.01)
*H04W 72/23* (2023.01)

(52) U.S. Cl.
CPC ... *H04W 72/1268* (2013.01); *H04W 72/0453* (2013.01); *H04W 72/23* (2023.01)

(58) Field of Classification Search
CPC ......... H04W 72/1268; H04W 72/0453; H04W 72/23; H04W 72/21
See application file for complete search history.

(56) References Cited

U.S. PATENT DOCUMENTS

2010/0150086 A1* 6/2010 Harada ............. H04W 56/0005
370/329
2013/0163532 A1* 6/2013 Anderson ............. H04L 5/0053
370/329
(Continued)

FOREIGN PATENT DOCUMENTS

WO     WO 2018/116051 A1    6/2018
WO     WO-2018116051 A1 *   6/2018 ............... H04L 5/00

OTHER PUBLICATIONS

International Search Report and Written Opinion of the International Searching Authority, PCT/IB2018/056193, dated Apr. 8, 2019, 12 pages.
(Continued)

*Primary Examiner* — Edan Orgad
*Assistant Examiner* — Malick A Sohrab
(74) *Attorney, Agent, or Firm* — Sage Patent Group (57) ABSTRACT

Systems, methods and apparatus are disclosed for user equipment and/or network nodes. An example method performed by a network node includes providing a shared resource to a plurality of user equipments (UEs) that are active on a bandwidth part (BWP). The network node receives a Scheduling Request (SR) on the shared resource of the BWP, and responsive to the SR, assigns one or more grants to one or more of the plurality of UEs that are provided with the shared resource. The network node monitors another resource, for a time window after the assigning of the one or more grants, and after receiving a transmission on the monitored resource from a UE, provides the UE with a dedicated resource on the BWP.

20 Claims, 8 Drawing Sheets

(56) References Cited

U.S. PATENT DOCUMENTS

2015/0305065 A1* 10/2015 Bai .................. H04W 74/0833
370/329
2018/0123742 A1* 5/2018 Yi ........................ H04W 72/23
2020/0044723 A1* 2/2020 Cirik ................... H04B 7/0695

OTHER PUBLICATIONS

Catt, 3GPP TSG-RAN WG2#101bis, R2-1804484, "The Validity of CFRA Resources for BFR", Sanya, China, Apr. 16-20, 2018, (XP051441505) 4 pages.
Ericsson, 3GPP TSG-RAN WG1 Meeting #92, R1-1802909, "On PUCCH Resource Allocation Before RRC Connection", Athens, Greece, Feb. 26-Mar. 2, 2018, (XP051398298) 6 pages.
Catt, 3GPP TSG-RAN WG1 Meeting #93, R1-1806298, "On PUCHH Resource Allocation", Busan, Korea, May 21-25, 2018, (XP051441505) 6 pages.
ZTE; "Consideration on the SR in NR"; 3GPP TSG-RAN WG2 Meeting#99bis; R2-1710319; Prague, Czech Republic Oct. 9-13, 2017; 4 pages.
First Office Action dated Aug. 22, 2023 for Chinese Patent Application No. 201880096599.X, 9 pages (includes English translation).

* cited by examiner

SHARED RESOURCE CONFIGURATION FOR BANDWIDTH PARTS

CROSS REFERENCE TO RELATED APPLICATIONS

This application is a 35 U.S.C. § 371 national stage application of PCT International Application No. PCT/IB2018/056193 filed on Aug. 16, 2018, the disclosure and content of which is incorporated by reference herein in its entirety.

TECHNICAL FIELD

The present disclosure relates to wireless communication systems such as cellular networks, and more particularly to methods, user equipments, and network nodes for configuring resources in a radio access network.

BACKGROUND

The evolving 5G standard for NR (New Radio) aims to operate in a wide range of frequencies from below 1 GHz up to 100 GHz. For NR, there is ongoing discussion relating to the 3rd Generation Partnership Project (3GPP) regarding bandwidth parts (BWPs). As discussed, each BWP is a subset of total cell bandwidth, and may include a contiguous group of physical resource blocks (PRBs). BWPs provide many advantages to user equipments, including that some user equipments may be unable to access an entire bandwidth provided in a cell and thus benefit by having access to a smaller portion of that bandwidth via a BWP. Moreover, BWPs also reduce user equipment energy requirements and provide battery savings.

According to the 3GPP discussions, each user equipment may be assigned an initial BWP that is configured via system information (SI) messages. User equipment can also be configured with additional dedicated BWPs via radio resource control (RRC) signaling. Each user equipment can have up to four downlink (DL) and uplink (UL) BWPs, of which only one BWP is active for a specific user equipment at a time. Switching between BWPs is performed using downlink control information (DCI) provided on a physical downlink control channel (PDCCH). In NR there may be a large number of physical uplink control channel (PUCCH) resources for a user equipment configured on a BWP. For example, if the user equipment is configured with 8 scheduling request (SR) configurations then the user equipment may be configured with up to eight PUCCH-SR resources on a BWP.

In addition to PUCCH resources above, a BWP may also be assigned random access channel (RACH) resources. A paper by CATT entitled "The validity of CFRA resources for BFR," 3GPP Draft, R2-1804484 discusses contention free RACH (CFRA) resources, and identifies that reserving such resources for a user equipment has disadvantages including inefficient RACH resource utilization; high RACH collision probability for other user equipments when the RACH load in the network is medium to high; and that CFRA-BFR can only be used for a small number of user equipments due to the large amount of reserved resources. The paper discusses ways to improve resource utilization including providing timer based CFRA resources, a CFRA resource suspension mechanism, and reusing suspended CFRA resources by other UE.

SUMMARY

The examples disclosed in the present disclosure provide techniques for more effectively managing resource overhead and/or reducing latency by providing a shared resource over a BWP. While the techniques described herein are generally described in the context of PUCCH resources, for example purposes, such techniques may also be applied to other types of control resources, including PDCCH resources and/or RACH resources, and other types of resources.

In an example, a method performed by a network node includes providing a shared PUCCH resource to a plurality of user equipments (UEs) that are active on a BWP. The network node receives an SR on the shared PUCCH resource of the BWP. Responsive to the SR, the network node assigns one or more grants to one or more of the plurality of UEs that are provided with the shared PUCCH. The network node monitors, for a time window after assigning the one or more grant, a PUSCH resource, and after receiving a PUSCH transmission on the monitored PUSCH resource from a UE of the plurality of UEs, provides the UE with a dedicated PUCCH resource on the BWP.

In another example, a method performed by a user equipment includes receiving, from a network node, an assignment of a shared PUCCH resource on a BWP, where the shared PUCCH resource is shared between a plurality of UEs. The user equipment provides an SR on the shared PUCCH resource of the BWP, and receives a grant corresponding to the SR. The user equipment provides, using the grant, a PUSCH transmission on a monitored PUSCH resource, and after providing the PUSCH transmission, receives a configuration corresponding to a dedicated PUCCH resource on the BWP.

In yet other examples, a system including the user equipment and/or network node are provided that perform the above methods. Further, the present disclosure also provides a non-transitory computer-readable medium comprising computer instructions stored thereon that, when executed by a processing circuit, cause the processing circuit to perform the above methods.

BRIEF DESCRIPTION OF THE DRAWINGS

For a more complete understanding of the disclosed embodiments and their features and advantages, reference is now made to the following description, taken in conjunction with the accompanying drawings.

DETAILED DESCRIPTION

As discussed above, a user equipment may be configured with up to four BWPs, each having up to eight PUCCH-SR resources. This means that a relatively large amount of the total available UL resources are used for PUCCH resources. These configured resources reduce the amount of space available for PUSCH transmissions on the BWPs. Additionally, although a user equipment can have up to four BWPs configured, it keeps only one BWP active. This means that 75% of the configured PUCCH resources are reserved but not used for data transfer. Therefore, the reservation of PUCCH on all BWPs lead to a low PUCCH resource utilization and decreases the PUSCH capacity.

Figure 1:
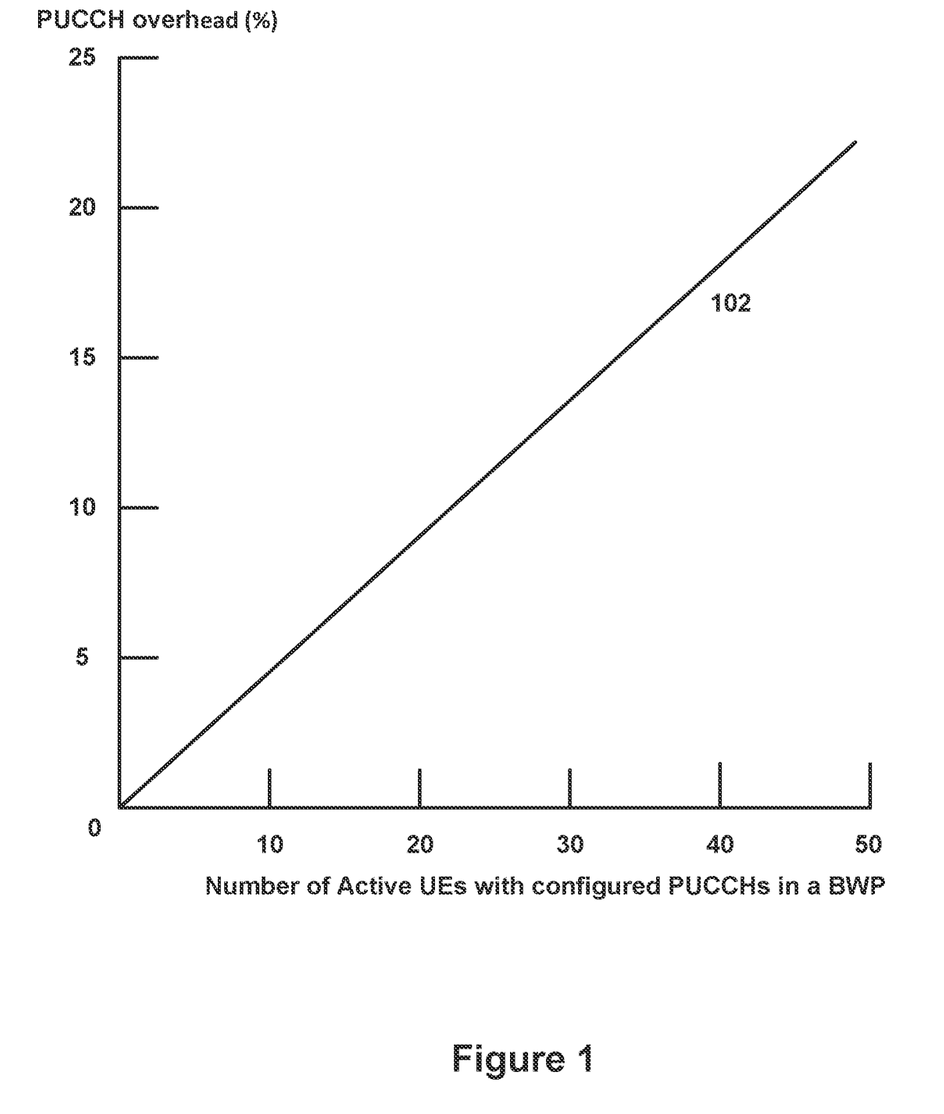
FIG. 1 is a line graph that illustrates a PUCCH overhead relative to a number of active user equipments that are configured with a PUCCH resource in a BWP, according to some examples.

The conventional technique of configuring PUCCH resources on every BWP for every user equipment consumes an excessive amount of resources. Further, such techniques may cause failures in an NR network under a moderate to high load. In more detail, FIG. 1 is a line graph that illustrates a PUCCH overhead relative to a number of active user equipments that are configured with a PUCCH resource in a BWP. The line 102 represents a PUCCH overhead (without multiplexing) for a BWP, relative to a number of active user equipments in a 10 MHz BWP. In this example, each user equipment has three logical channels (LCH), such as a signaling radio bearer (SRB) and two data radio bearers (DRBs). Accordingly, each user equipment would have three PUCCHs. As shown in this example, the PUCCH overhead increases to around 20% for 50 active users.

To mitigate low utilization issues, an active BWP may not be assigned PUCCH or RACH resources. However, without configuring PUCCH resources on the active BWP, other uplink control information (UCI) such as hybrid automatic repeat request (HARQ) feedback, channel state information (CSI) for DL transmissions are transmitted on a physical uplink shared channel (PUSCH) in the active BWP, which competes for resources with traffic having critical quality of service (QoS) requirements, such as ultra-reliable low latency cellular (URLLC) network traffic. This also causes a negative impact on both transmission reliability and QoS requirements. Moreover, if a user equipment is moved to a BWP without configured PUCCH resources, the user equipment would not be able to send PUCCH-SRs in the BWP and would instead use the RACH channel for SRs, i.e., RA-SRs. However, a user equipment receiving a grant via a RACH procedure takes much longer than a user equipment receiving a grant via a PUCCH-SR, especially if there is a RACH collision with a transmission from other UE. Such delays caused by traditional techniques may be lengthy and cause unacceptable impacts on services with critical latency requirements.

The present disclosure provides techniques for more efficiently configuring resources (such as control resources including PUCCH, PDCCH, and/or RACH resources). These techniques address technical problems, such as those described above in detail, to manage resource overhead more effectively and/or reduce latency. These techniques include systems, methods, and apparatus for sharing resources between a plurality of user equipments that are active on the same BWP.

In some examples, these resource sharing techniques include providing a shared PUCCH resource on a BWP that can be used by any user equipment that is switched to the BWP and that does not have a dedicated PUCCH configuration on the BWP. If two or more user equipments are switched to the BWP, the user equipments are initially configured with the same shared PUCCH. Because the network node may not be able to identify the sender user equipment of an SR request, when the network node receives an SR request on the shared PUCCH it may provide grants to all user equipments that share this PUCCH. This shared PUCCH may be used only for a limited time where after the user equipments are configured with dedicated PUCCH resources on the BWP via RRC signaling.

In other examples, a user equipment being switched to a BWP where it has no dedicated PUCCH can share the PUCCH resource of another user equipment active in the BWP by splitting the shared PUCCH resource in time or frequency. In more detail, the user equipments are configured with the same shared PUCCH resources over the different BWPs. When user equipments are active on different BWPs, each user equipment can use the entire shared PUCCH resources on its active BWP. When a user equipment is switched to a BWP where another user equipment is active, layer 1 (L1) signaling orders the user equipments to share the PUCCH resources. Because the network node may identify which user equipment is using the PUCCH, it may provide a grant responsive to an SR of the sending UE, without sending grants to other UE. RRC signaling can be similarly be used in this example to configure dedicated PUCCH resources The above techniques allow the network to configure a reduced amount of PUCCH resources for BWPs, which is especially advantages where there are a plurality of BWPs configured per UE. At the same time, RRC signaling to configure PUCCH resources may be reduced, and therefore reduce latency caused by such signaling when a user equipment is moved to a BWP where it does not have dedicated PUCCH resources. Accordingly, the present disclosure provides advantages including enhanced resource utilization for PUCCH; reduced need for reconfiguration by adding a PUCCH to an active BWP and hence reducing transmission delays and RRC signaling overhead; and/or fast signaling for sharing PUCCH in active BWP (before RRC reconfiguration can be done). Certain embodiments may have none, some, or all of the recited advantages, and other technical advantages may be readily apparent to one having skill in the art.

Figure 2:
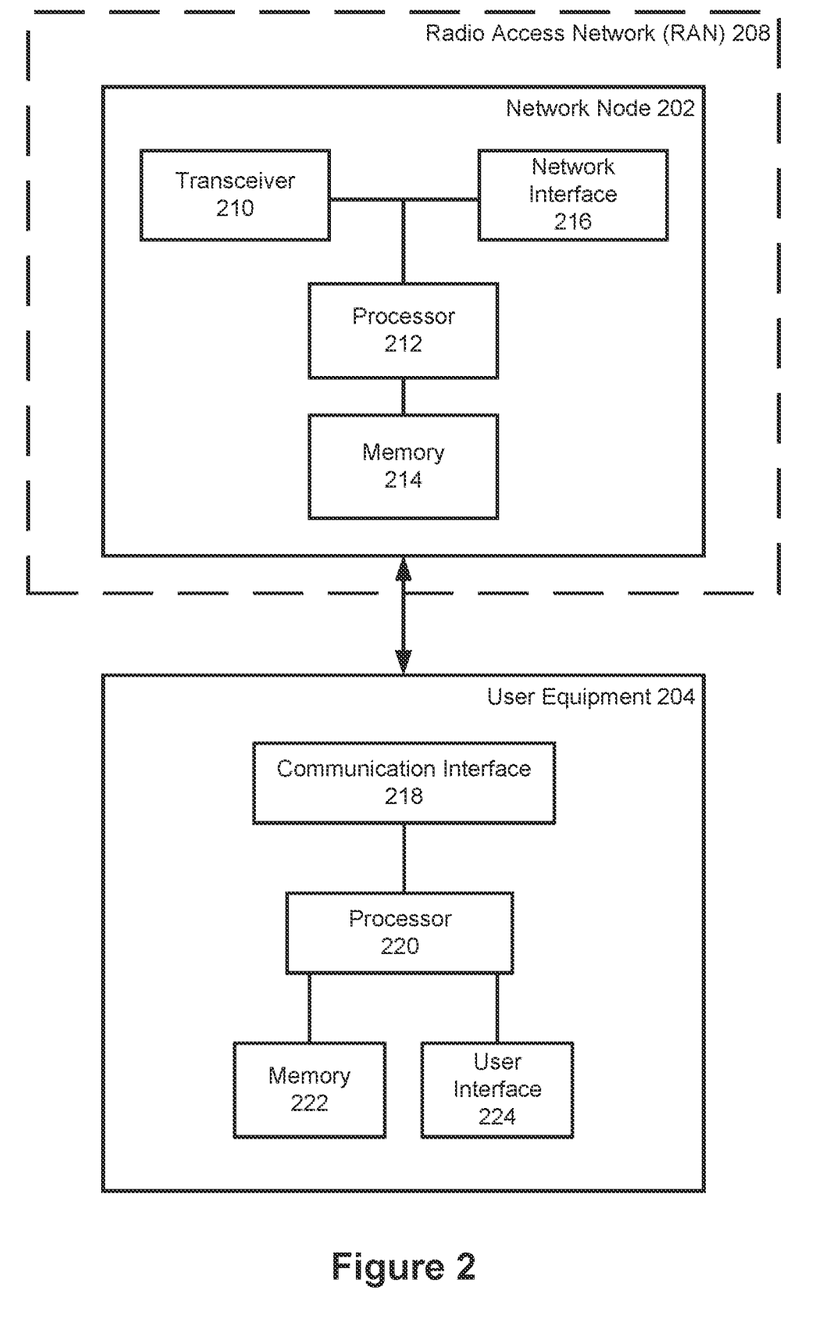
FIG. 2 is a schematic block diagram illustrating a system that includes a network node and a user equipment, according to some examples.

FIG. 2 is a schematic block diagram illustrating a system that includes a network node 202 and a user equipment 204. In some examples, the network node 202 and/or user equipment 204 perform methods and signaling as described in further detail with respect to FIGS. 3-8.

In the present example, the network node 202 includes a base station, such as an Evolved Node B (eNB), Next Generation Node B (gNB), and/or a network gateway node or other network equipment. In the present example, the network node 202 is communicatively coupled to the user equipment 204 via any combination of wired and/or wireless technologies, such as via radio signals. Signaling that may be performed via the communicative coupling is described in further detail with respect to FIGS. 5 and 7. The network node 202 may be provided by one or more computing devices, and may be communicatively coupled via a radio access network 208 to one or more other network nodes or backend computing devices, such as core network nodes.

In the present example, network node 202 is structured with a transceiver 210 having a transmitter and a receiver that provide uplink and downlink radio communications with wireless devices, such as user equipment 204. The network node 202 is structured with a network interface 216 that provides communications with other nodes of the network (e.g., with other base stations and/or core network nodes). The network node 202 is structured with a processor 212, which may comprise processing circuitry having one or more central processing units (CPUs), coupled to the transceiver 210 and the network interface 216. The network node 202 is structured with a memory 214 coupled to the processor 212. The memory 214 may include one or more non-transitory computer readable media storing computer readable program code that when executed by the processor causes the processor 212 to perform operations according to embodiments disclosed herein, such as those described in more detail with respect to FIGS. 3-8.

In the present example, the user equipment 204 includes a user device, such as a mobile/smart phone, laptop, personal computer, smart television, or other wired/wireless communication device. The user equipment 204 includes a communication interface 218, such as a modem, that communicatively couples the user equipment 204 to the network node 202 via the wired and/or wireless technologies, and that provides UL and DL radio communications with network node 202 and/or other network nodes in that RAN 208. The user equipment 204 is structured with a processor 220, which may comprise processing circuitry having one or more central processing units (CPUs), coupled to the communication interface 218. The user equipment 204 is structured with a memory 222 coupled to the processor 220. The memory 214 may include one or more non-transitory computer readable media storing computer readable program code that when executed by the processor causes the processor 212 to perform operations according to embodiments disclosed herein, such as those described in more detail with respect to FIGS. 3-8. In the present example, user equipment 204 is also structured with a user interface 224, such as a display, keyboard, mouse, touch screen, microphone, speaker, and/or other user input/output (I/O) device.

Figure 3:
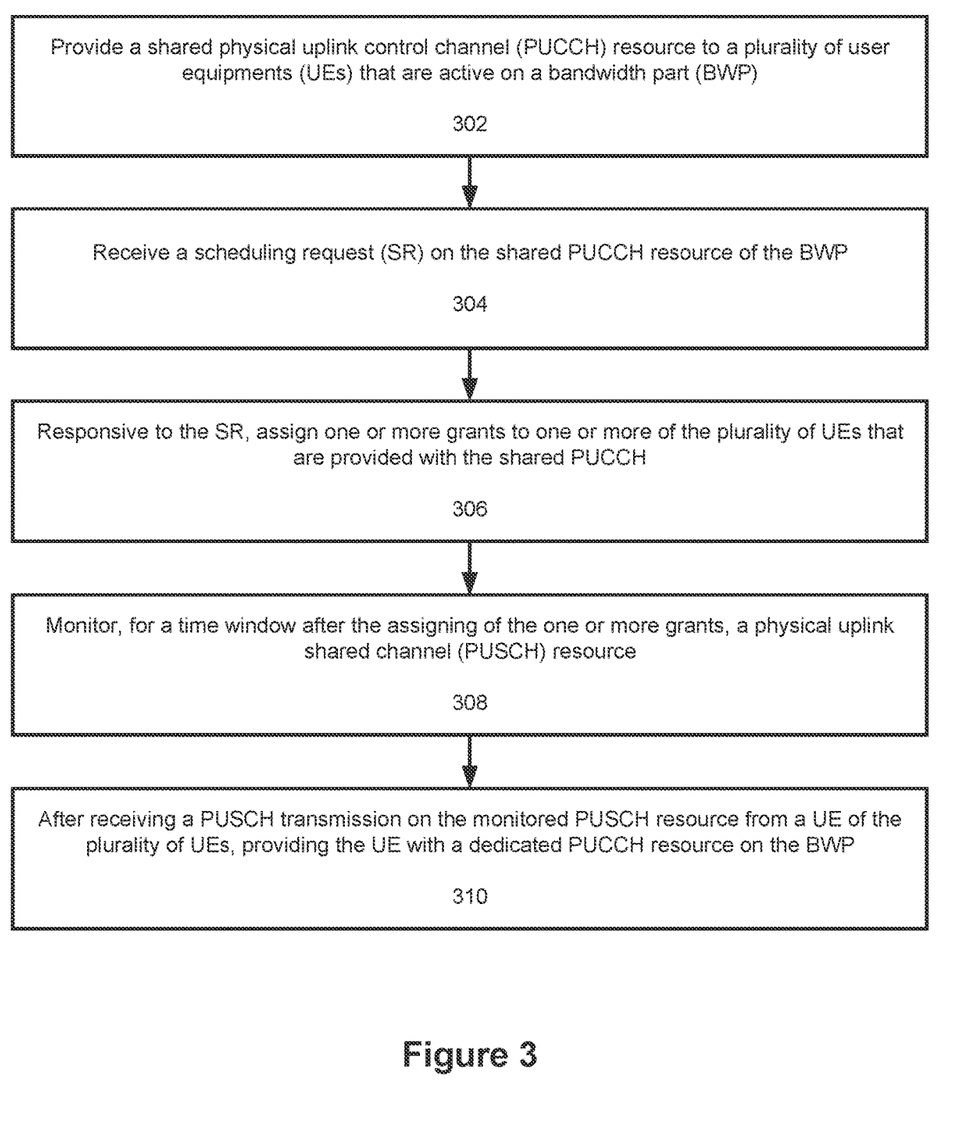
FIG. 3 is a flow diagram illustrating a method performed by a network node for configuring a shared resource corresponding to a BWP, according to some examples.

FIG. 3 is a flow diagram illustrating a method performed by a network node for configuring a shared resource corresponding to a BWP. In some examples, the method is performed by a network node 202 in a system that is described in more detail with respect to FIG. 2. In some examples, the method is performed in combination with one or more of the methods and/or signaling described with respect to any of FIGS. 4-8.

At step 302, a network node provides a shared physical uplink control channel (PUCCH) resource to a plurality of user equipments (UEs) that are active on a bandwidth part (BWP). This may include the network configuring a set of one or more PUCCH resources that are shared by a group of UEs operating in a connected mode. The network node may further provide an identifier to the UE that defines the UE as having a sharing relation with the shared PUCCH resource. In this way, the UEs in a same group can share a PUCCH resource that is configured and associated with the group. In some examples, these shared PUCCH resources are used by the sharing UEs in the same group in a contention based fashion. UE may maintain multiple sharing relations with other shared PUCCH resources, such as shared PUCCH resources provided via other BWPs.

In some examples, the BWP is a subset of a plurality of BWPs that occupy a total cell bandwidth, and each of the UEs is assigned one or more BWPs by the network node. In some examples, the network node provides the shared PUCCH resource to a UE as an initial configuration when the UE is switched to the BWP. This may be when, for example, the UE is switched to the BWP from another BWP or when the UE is switched to the BWP during its initial connection to the network node. The network node may provide the shared PUCCH resource to the plurality of UEs using Radio Resource Control (RRC) signaling and/or other signaling techniques.

In some examples, the shared PUCCH resource is split in at least one of time or frequency between the UE and at least one other UE of the plurality of UEs. In some examples, the shared PUCCH resource is shared by the network node assigning each UE of the plurality of UEs with a mask that defines a portion of the shared PUCCH resource that each UE is allowed to access. The defined portion may be a frequency portion and/or time portion of the shared PUCCH resource.

In some examples, the shared PUCCH resource is associated with a window that limits a duration that the UE is provided with access the shared PUCCH resource. The window may be a time window, such that when a preconfigured threshold time duration is reached, the network node switches the UE to another PUCCH resource.

At step 304, the network node receives, from a UE, a scheduling request (SR) on the shared PUCCH resource of the BWP. In some examples, upon the reception of the PUCCH transmission, the network node may not identify the transmitting UE specifically, but instead identify the group that is associated with the PUCCH resource. In some examples, the network node identifies the group based on an identifier included in the transmission.

At step 306, responsive to the SR, the network node assigns one or more grants to one or more of the plurality of user equipments that are provided with the shared PUCCH. The one or more grants may be assigned to the group of user equipment that is provided with access to the shared PUCCH. This may be performed by providing a non-UE specific grant via the shared PUCCH such that any UE accessing that shared PUCCH would receive the grant. In other examples, a grant for each UE may be associated with a different UE in the group of UE sharing the shared PUCCH. In some examples, prior to assigning the grants, the network node determines that the SR is associated with a group that is associated with the shared PUCCH resource. Upon determining that the SR is associated with the group assigned to the shared PUCCH resource, the network node assigns the grants.

At step 308, after assigning the grants the network node monitors a physical uplink shared channel (PUSCH) resource for a window of time.

At step 310, after receiving a PUSCH transmission on the monitored PUSCH resource from a UE of the plurality of UEs, the network node provides the UE with a dedicated PUCCH resource on the BWP, where the dedicated PUCCH resource is not shared with others of the plurality of UEs but is instead reserved for the UE's data transmissions. Upon receiving the PUSCH transmission, the network node may further identify a particular UE that is lacking a dedicated PUCCH configuration, and accordingly, determine to reconfigure the UE with a dedicated PUCCH configuration on the UE's active BWP.

In some examples, the network node removes the UE's access to the shared PUCCH resource when the UE is provided with the dedicated PUCCH resource. The network node may remove the access to the shared PUCCH resource at the time of, or shortly thereafter, providing the access to the dedicated PUCCH resource. In some examples, after switching the UE to the dedicated resource, the shared PUCCH resource is provided to a second UE as a dedicated PUCCH resource, where the second UE previously shared the shared PUCCH resource with the other UE.

In some examples, the assigning of the dedicated PUCCH resource to the UE is performed responsive to the network node determining a PUCCH load corresponding to the BWP is at or below a threshold PUCCH load. Accordingly, based on the determining, the network node assigns one or more of the plurality of UEs to dedicated PUCCH resources.

In some examples, after a UE is assigned to a dedicated PUCCH resource, the network node determines that a PUCCH load corresponding to the BWP is at or above a threshold PUCCH load. Based on the determining, the network node identifies one or more of the plurality of UEs that are below a threshold activity level. Based on the identifying, the network node assigns the one or more of the plurality of UEs to the shared PUCCH resource. Accordingly, the UE may access the shared PUCCH resource rather than each having access to a dedicated PUCCH resource.

Figure 4:
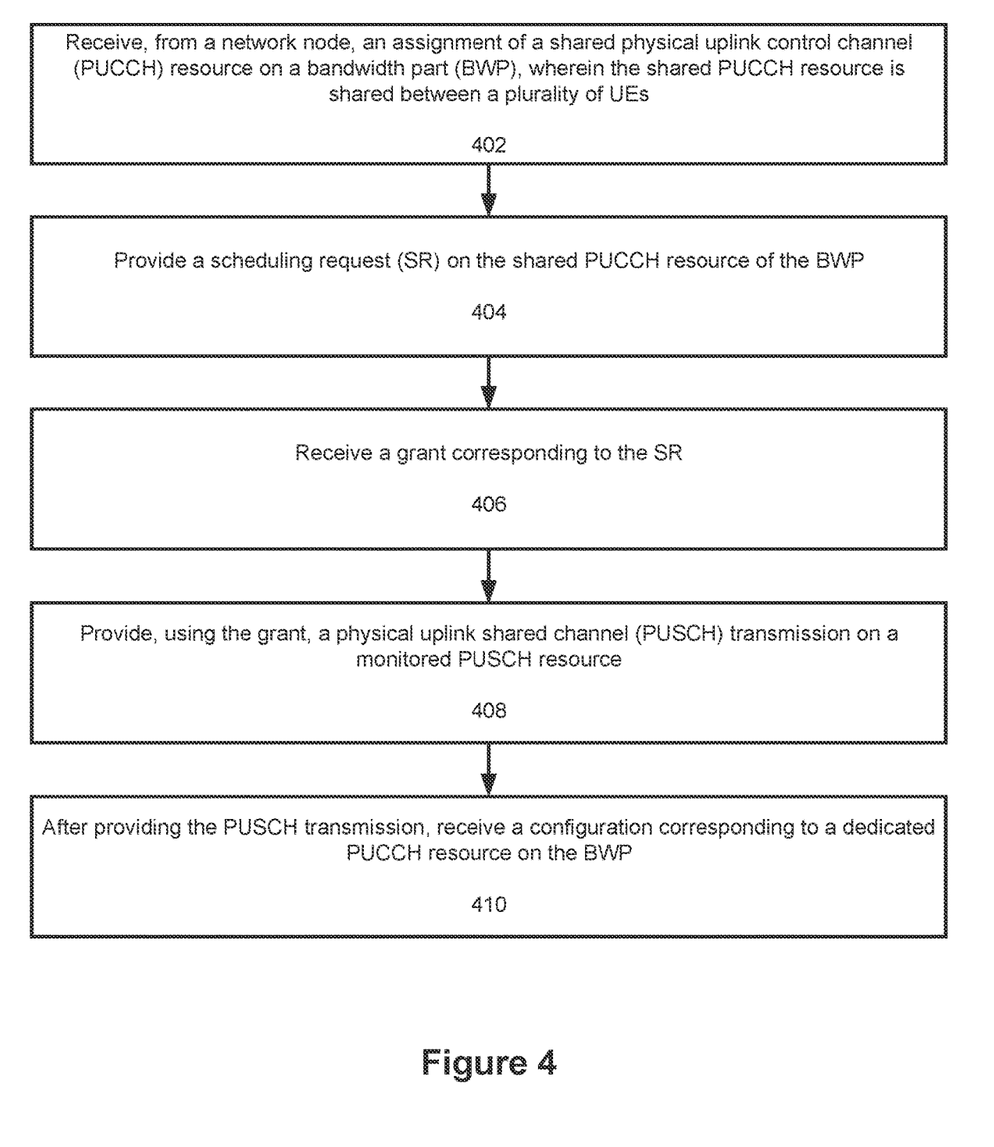
FIG. 4 is a flow diagram illustrating a method performed by a user equipment for configuring a shared resource corresponding to a BWP, according to some examples.

FIG. 4 is a flow diagram illustrating a method performed by a user equipment for configuring a shared resource corresponding to a BWP. In some examples, the method is performed by a UE 204 in a system that is described in more detail with respect to FIG. 2. In some examples, the method is performed in combination with one or more of the methods and/or signaling described with respect to any of FIGS. 3 and 5-8.

At step 402, the UE receives, from a network node, an assignment of a shared physical uplink control channel (PUCCH) resource on a BWP. In some examples, the BWP is a subset of a plurality of BWPs that occupy a total cell bandwidth, and each of the UE is assigned one or more BWPs by the network node. The UE may receive its assignment of the shared PUCCH resource as an initial configuration when the UE is switched to the BWP by the network node. In some examples the UE is switched to the BWP from another BWP that is provided via the network node, and in other examples the UE is switched to the BWP when the UE initially accesses the network node. The UE may receive its assignment to the shared PUCCH resource from the network node using Radio Resource Control (RRC) signaling and/or other signaling techniques.

In the present example, the shared PUCCH resource is shared between a plurality of UEs. Each of the UE may transmit over a particular portion of the shared PUCCH, where the particular portion is defined using a mask. In some examples, a mask is assigned by the network node to each UE, where the mask indicates a particular time portion and/or frequency portion of the shared PUCCH that the UE is assigned to use for its data transmissions. Accordingly, with each UE using its assigned mask, the shared PUCCH resource is split in at least one of time and/or frequency between the UE and at least one other UE of the plurality of UEs.

In some examples, the shared PUCCH resource is associated with a window that limits a duration that the UE can access the shared PUCCH resource before being switched to another PUCCH resource, such as a dedicated PUCCH resource that is not shared with other UE of the plurality of UEs.

At step 404, the UE provides a scheduling request (SR) to the network node on the shared PUCCH resource of the BWP. In some examples, the SR includes an identifier that associates the SR with a group corresponding to the shared PUCCH resource. In some examples, each UE accessing the shared PUCCH resource is associated with the group.

At step 406, the UE receives, from the network node, a grant corresponding to the SR.

At step 408, using the grant the UE provides, to the network node, a physical uplink shared channel (PUSCH) transmission on a monitored PUSCH resource.

At step 410, after providing the PUSCH transmission, the UE receives a configuration from the network node corresponding to a dedicated PUCCH resource on the BWP. After receiving the configuration corresponding to the dedicated PUCCH resource, the UE may then transmit further communications using the dedicated PUCCH resource instead of the shared PUCCH resource.

Figure 5:
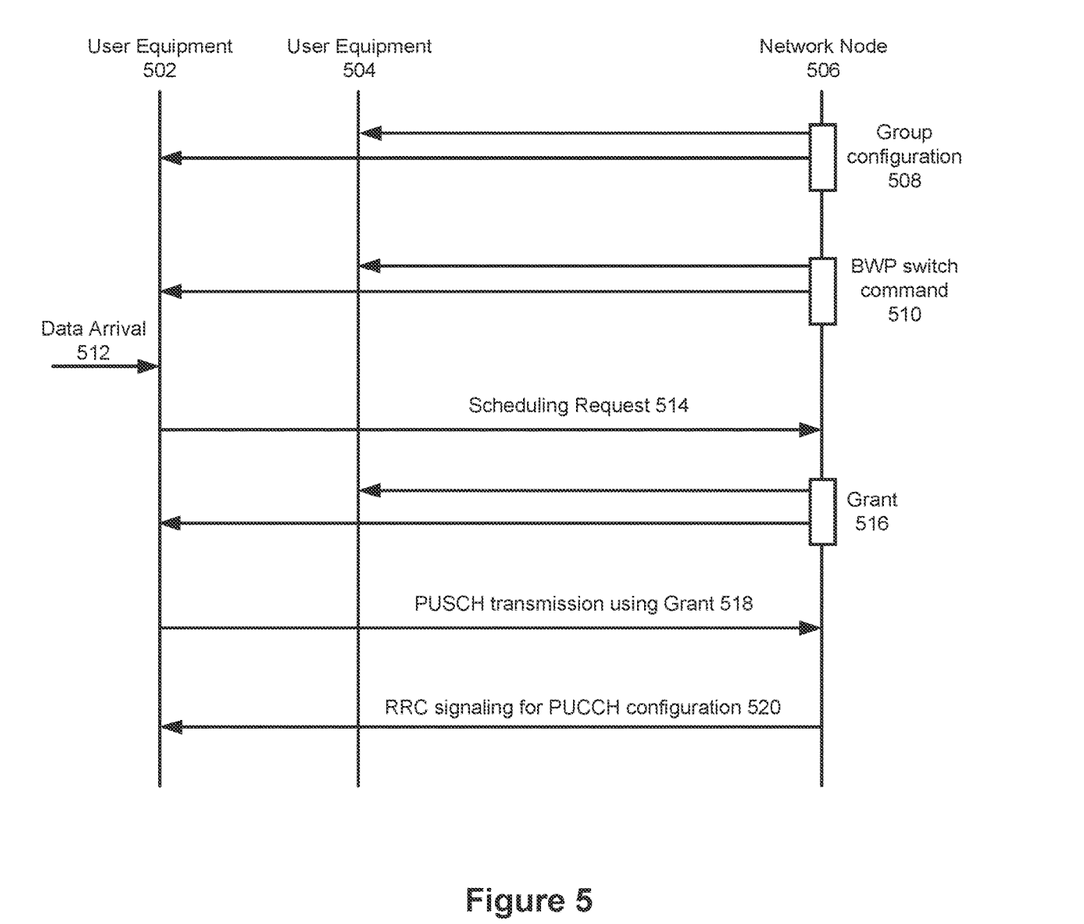
FIG. 5 is a sequence diagram illustrating signaling for activating a dedicated resource for a user equipment that was previously assigned a shared resource, according to some examples.

FIG. 5 is a sequence diagram illustrating signaling for activating a dedicated resource for a user equipment that was previously assigned to a shared resource. In some examples, the signaling is performed by network node 202 and a user equipment 204 in a system that is described in more detail with respect to FIG. 2. In some examples, the signaling corresponds to one or more of the methods that are described with respect to any of FIGS. 3, 4, and 6-8.

The sequence includes a user equipment 502 and a user equipment 504 receiving signaling from a network node 506 corresponding to a group configuration 508 of a shared resource. In the present example, the shared resource is a PUCCH resource. RRC signaling may be used to perform the configuration, which may be maintained by an RRC or MAC layer. In the present example, the user equipments are aware that the shared resource is or may be shared between a plurality of user equipments.

The network node 506 provides a switch command 510 to the user equipment 502 and the user equipment 504 to cause the user equipment to switch to a specified BWP. In some examples, a new MAC CE or DCI based signaling is defined by a network node (e.g., network node 506) to move a user equipment (e.g., user equipment 502 or 504) from one resource (e.g., a first PUCCH resource) to another resource (e.g., a second PUCCH resource). The signaling carries information on one or more of the below fields:
1. an index for the old PUCCH resource/configuration;
2. an index for the new PUCCH resource/configuration;
3. service/LCH/SR configuration indices to associate with the new PUCCH resource, or the information type of UCI that is associated with new PUCCH resource; and/or
4. a mask indicator that identifies which parts of a shared PUCCH resource the user equipment is allowed to use.

The sharing mechanism can be disabled by the network when the network node 706 determines that there are sufficient PUCCH resources to assign user equipments to dedicated resources that are not shared between multiple UE. The determination that there are sufficient resources may be determined by the network node 506 when an identified threshold is below or equal to a pre-configured PUCCH resource threshold.

After receiving a data arrival 512, the user equipment 502 provides the network node 506 with a scheduling request that indicates that the user equipment 502 has data to send. Responsive to the scheduling request 514, the network node 506 provides a grant 516 to user equipment 502 and user equipment 504 that are configured to be in the group sharing the resource (such as a shared PUCCH resource). Because the network node may not be able to identify the sender user equipment of an SR request, when the network node receives an SR request on the shared PUCCH it may provide grants to all user equipments that share this PUCCH.

Upon receiving the grant 516, the user equipment 502 provides the data to the network node 506 via a PUSCH transmission. The network node 506 then performs RRC signaling with the user equipment 502 that reconfigures the user equipment 502 with a dedicated resource (e.g., a dedicated PUCCH resource) on the specified BWP.

Figure 6:
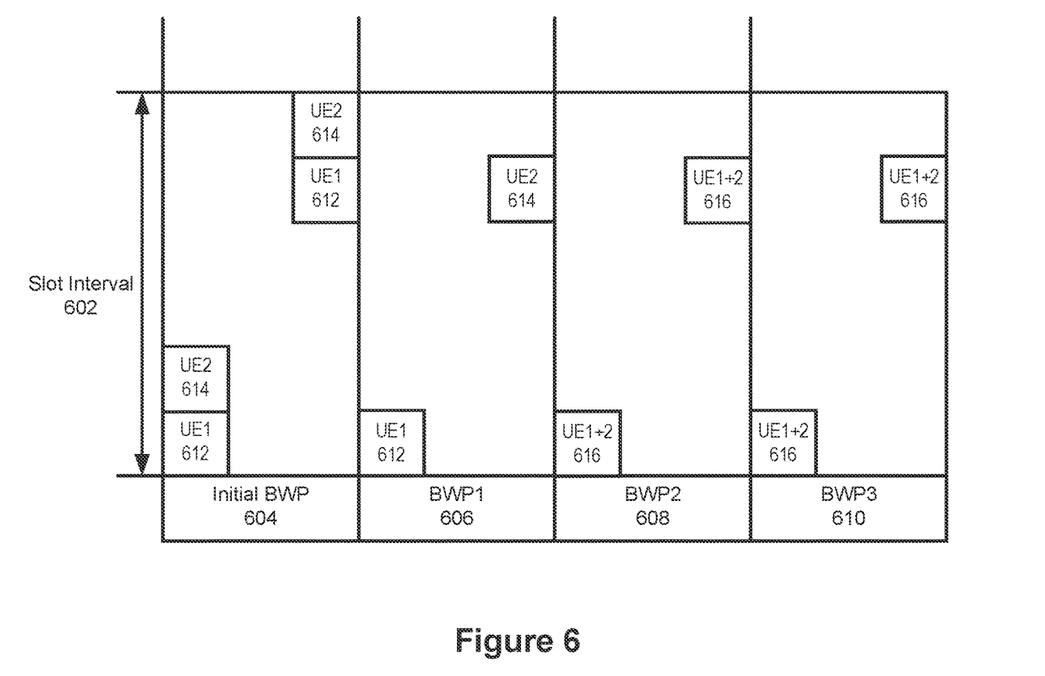
FIG. 6 is a block diagram illustrating splitting a shared resource between a plurality of UEs, according to some examples.

FIG. 6 is a block diagram illustrating splitting a shared resource between a plurality of UEs. In the present example, the resource may be shared in the system described with respect to FIG. 1, and/or using the techniques described with respect to any of FIGS. 3-5, 7, and 8.

As shown in FIG. 6, a slot interval 602 provides a time portion during which data can be transmitted. The slot interval 602 may have a length of 0.5 ms or another pre-defined length (which may be longer or shorter than the length of 0.5 ms). There are multiple BWPs (initial BWP 604, BWP1 606, BWP2 608, and BWP3 610) that each provide a frequency portion, such as a contiguous group of physical resource blocks (PRBs), of a bandwidth that may be used by the UE to transmit data during the slot interval 602.

In the present example, there is an initial configuration provided on the initial BWP 604 where UE1 612 and UE2 614 share a same PUCCH resource by transmitting data in different time and frequency portions of the resource. As indicated by the UE1+2 616 blocks, a first UE (UE 1 612) and a second UE (UE 2 614) both share a same resource configuration in BWP2 608 and BWP3 610, such that both UE1 612 and UE2 614 can transmit in a same time and frequency portion.

Each UE may share the resource using an assigned mask or subset indicator. The mask or subset indicator defines what time and/or frequency portion of the shared PUCCH resource that a specific UE may use when more than one sharing UE is active in the same BWP. When both UE have the same active BWP, their respective masks indicate which part of the shared PUCCH each UE can use when both are active in the same BWP. In this example, UE1 612 uses the PUCCH resources in the lower frequency part of the end of the slot interval 602 and UE2 614 uses the PUCCH resources in the higher frequency part in the beginning of the slot interval 602 in the initial BWP. The mask can be defined with a same periodicity as the PUCCH configuration (e.g. per slot). In the event that there are fewer PUCCH resources within the definition of the mask than sharing UE, the PUCCH resources can be time multiplexed over a longer period (even/odd slots, sub-frames, and so forth).

The shared PUCCH resource may be activated for two or more sharing UE in a same BWP when UE2 614 is switched to an active BWP of UE1 612. A network node may perform the switch by indicating or activating the sharing in the DCI switch command to UE2 614 and providing a PDCCH order to the UE1 612. These commands can be either to activate an already configured mask (which may be configured by RRC in the BWP configuration) or the command can include the mask index to apply.

Figure 7:
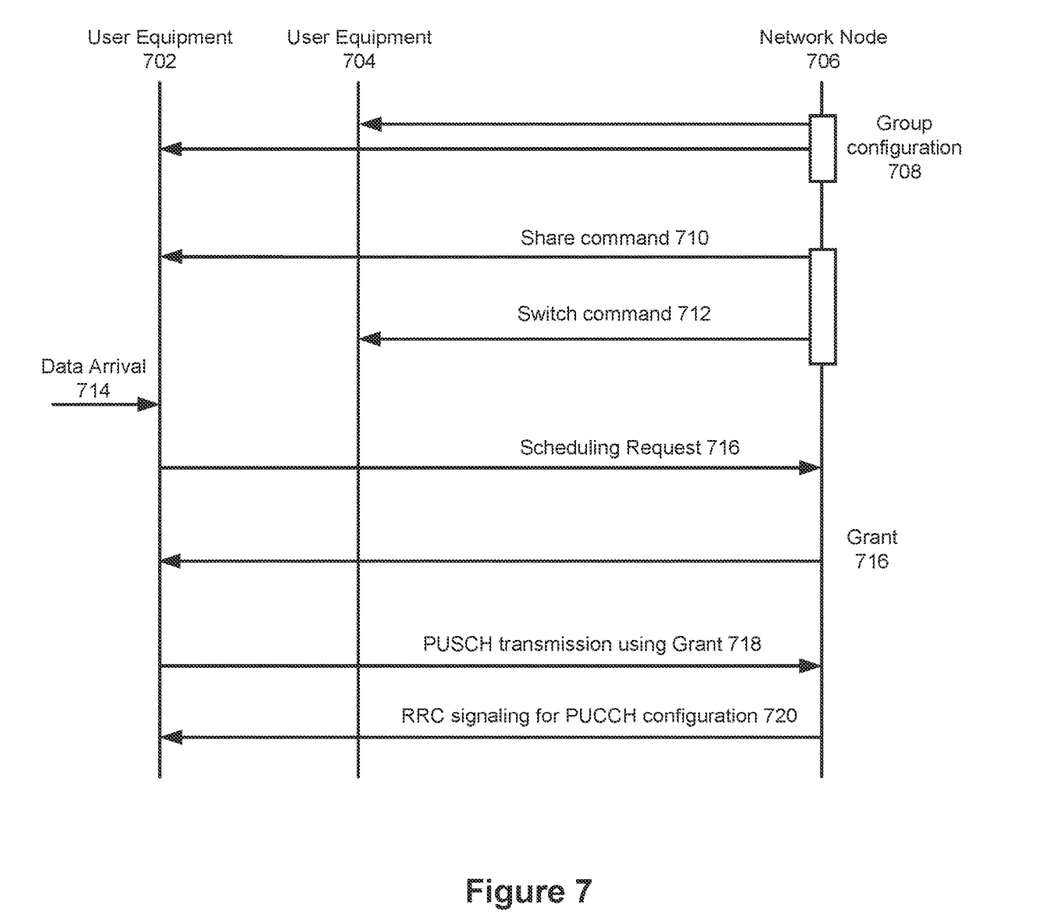
FIG. 7 is a sequence diagram illustrating signaling for activating a shared resource for a user equipment that was previously assigned a dedicated resource, according to some examples.

FIG. 7 is a sequence diagram illustrating signaling for activating a shared resource for a user equipment that was previously assigned a dedicated resource. In some examples, the signaling is performed by network node 202 and a user equipment 204 in a system that is described in more detail with respect to FIG. 2. In some examples, the signaling corresponds to one or more of the methods that are described with respect to any of FIGS. 3-6 and 8.

Initially, in the present example the network node 706 provides a group configuration 708 to the user equipment 702 and 704, such that user equipment 702 is active on a first BWP and user equipment 704 is active on a second BWP, and both user equipments are assigned shared resources (e.g., PUCCH resources) on both the first and second BWPs.

The network node 706 provides a share command 710 to user equipment 702. In some examples, the share command 710 includes a PDCCH order on a first BWP to user equipment 702 to use a first part of the PUCCH resource as indicated by a first mask that is assigned to user equipment 702.

The network node 706 provides a switch command 712 to user equipment 704. In some examples, the switch command 712 includes a DCI switch command on a second BWP to user equipment 704, that instructs user equipment 704 to use a second part of the PUCCH resource as indicated by a second mask that is assigned to user equipment 704. In some examples, a new MAC CE or DCI based signaling is defined by a network node (e.g., network node 706) to move a user equipment (e.g., user equipment 702 or 704) from one resource (e.g., a first PUCCH resource) to another resource (e.g., a second PUCCH resource). The signaling carries information on one or more of the below fields:

1. an index for the old PUCCH resource/configuration;
2. an index for the new PUCCH resource/configuration;
3. service/LCH/SR configuration indices to associate with the new PUCCH resource, or the information type of UCI that is associated with new PUCCH resource; and/or
4. a mask indicator that identifies which parts of a shared PUCCH resource the user equipment is allowed to use.

In some examples, the sharing mechanism may be enabled by the network when the network node determines that there is a risk of shortage of PUCCH resources. The risk of shortage of resources may be determined by the network node 706 when an identified threshold is above or equal to a pre-configured PUCCH resource threshold.

Accordingly, the user equipment 702 and user equipment 704 share a same PUCCH resource on the first BWP. Thus, once user equipment 702 has a data arrival 714 to transmit, user equipment 702 provides a scheduling request 716 to the network node 706. The network node responds by providing a grant 716 to user equipment 702 via the shared resource, and user equipment 702 uses the grant for a PUSCH transmission 718. Because the network node may identify which user equipment is using the PUCCH, the network node may provide a grant to the UE that sent the SR, without also sending grants to other UE.

If the shared PUCCH resources are not sufficient for the transmission of the data, an RRC reconfiguration of PUCCH resources may be applied via RRC signaling 720. This RRC signaling 720 may be performed to reconfigure user equipment 704 with new PUCCH on BWP1 and/or by reconfiguring user equipment 702 to use all of the shared PUCCH on BWP1.

Figure 8:
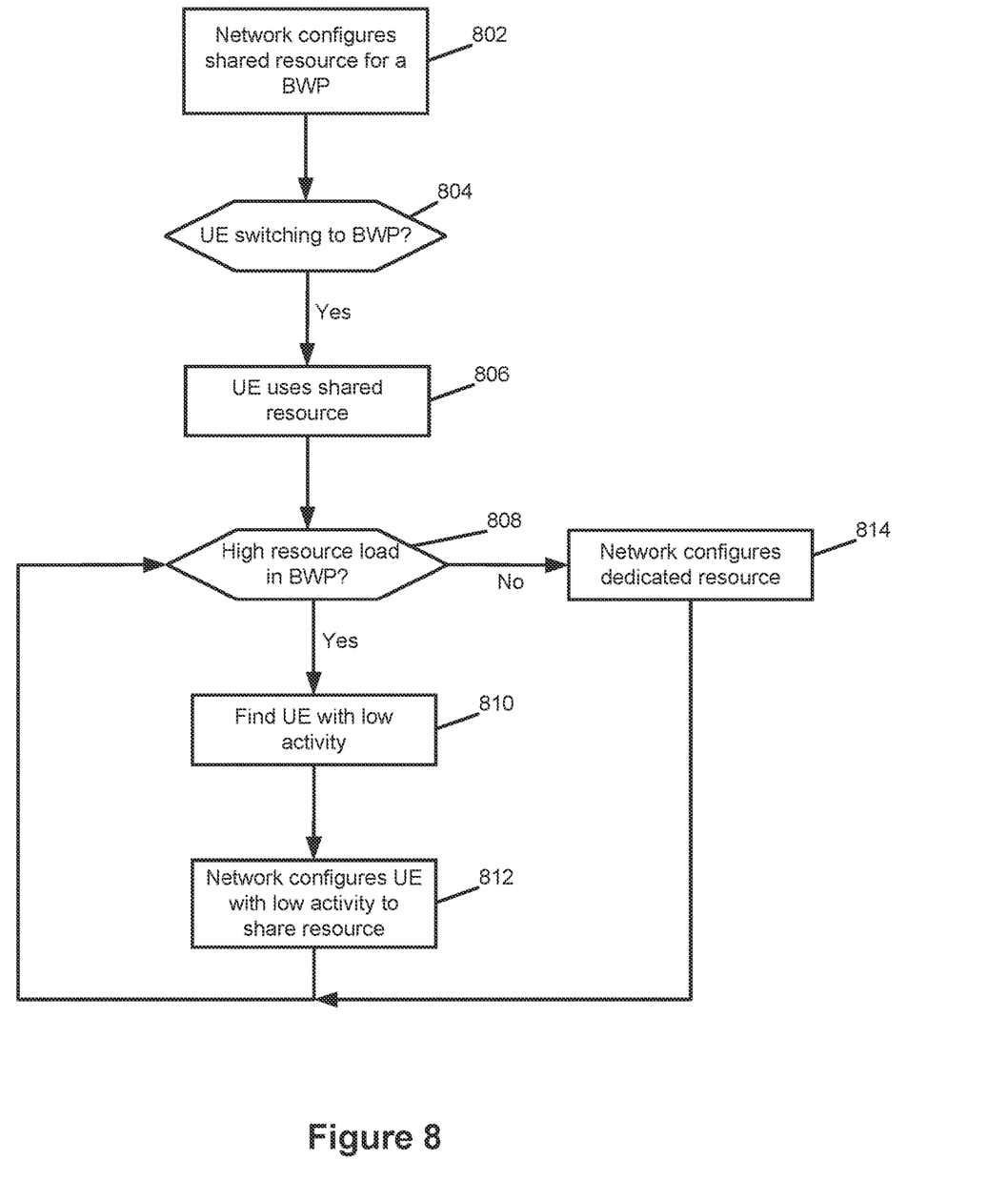
FIG. 8 is a flow diagram illustrating a method for configuring a shared or dedicated resource based on a BWP resource load, according to some examples.

FIG. 8 is a flow diagram illustrating a method for configuring a shared or dedicated resource based on a BWP resource load. In some examples, the signaling is performed by network node 202 and a user equipment 204 in a system that is described in more detail with respect to FIG. 2. In some examples, the method is performed in combination with one or more of the methods and/or signaling described with respect to any of FIGS. 3-7.

At step 802, a network node configures a shared resource (such as a PUCCH, PDCCH, or RACH resource) for a BWP. At step 804, the networked determines that a UE is switching to the BWP. At step 806, the network node assigns the UE to the shared resource with one or more other UE that are active in the BWP. At step 806, if the network node determines that there is a high load in the BWP with respect to the shared resource, such as when the load meets or exceeds a pre-configured threshold, then the network node finds UE with low activity at step 810 and configures the UE with low activity to share the resource at step 812. Otherwise, at step 814, if the network node determines that the resource load is at or below a pre-configured threshold, the network node configures one or more of the UE with a dedicated resource (such as a dedicated PUCCH, PDCCH, or RACH resource).

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method performed by a network node in a radio access network (RAN), the method comprising:
providing a shared physical uplink control channel (PUCCH) resource to a plurality of user equipments (UEs) that are active on a bandwidth part (BWP);
receiving a scheduling request (SR) on the shared PUCCH resource of the BWP;
responsive to the SR, assigning one or more grants to one or more of the plurality of UEs that are provided with the shared PUCCH;
monitoring, for a time window after assigning the one or more grants, a physical uplink shared channel (PUSCH) resource; and
after receiving a transmission on the monitored PUSCH resource from a UE of the plurality of UEs, providing the UE with a dedicated PUCCH resource on the BWP.

2. The method according to claim 1, further comprising:
prior to assigning the one or more grants, determining that the SR is associated with a group that is associated with the shared PUCCH resource.

3. The method according to claim 1, further comprising:
removing access to the shared PUCCH resource from the UE that is provided with the dedicated PUCCH resource.

4. The method according to claim 1, further comprising:
assigning each of the plurality of UEs with a mask that defines a portion of the shared PUCCH resource.

5. The method according to claim 4, wherein the defined portion of the shared PUCCH resource includes a frequency portion.

6. The method according to claim 1, further comprising:
determining that a PUCCH load corresponding to the BWP is at or below a threshold PUCCH load; and
based on the determining, assigning one or more of the plurality of UEs to dedicated PUCCH resources.

7. The method according to claim 6, further comprising:
providing a second UE of the plurality of UEs with dedicated access to the shared PUCCH resource.

8. The method according to claim 1, further comprising:
determining that a PUCCH load corresponding to the BWP is at or above a threshold PUCCH load;
identifying one or more of the plurality of UEs that are below a threshold activity level; and
based on the identifying, assigning the one or more of the plurality of UEs to the shared PUCCH resource.

9. The method according to claim 1, wherein the shared PUCCH resource is split in at least one of time or frequency between the UE and at least one other UE of the plurality of UEs.

10. The method according to claim 1, wherein the BWP is a subset of a plurality of BWPs that are assigned to the plurality of UEs.

11. The method according to claim 1, wherein the shared PUCCH resource is provided to the UE as an initial configuration when the UE is switched to the BWP.

12. The method according to claim 1, wherein the shared PUCCH resource is associated with a window that limits a duration that the UE can access the shared PUCCH resource.

13. The method according to claim 1, wherein the providing of the shared PUCCH resource is performed via Radio Resource Control (RRC) signaling.

14. The method according to claim 1, wherein the grant is assigned to each of the plurality of the UEs that is provided the shared PUCCH.

15. A method performed by a user equipment, UE, comprising:
receiving, from a network node, an assignment of a shared physical uplink control channel (PUCCH) resource on a bandwidth part (BWP), wherein the shared PUCCH resource is shared between a plurality of UEs;
providing a scheduling request (SR) on the shared PUCCH resource of the BWP;
receiving a grant corresponding to the SR;
providing, using the grant, a physical uplink shared channel (PUSCH) transmission on a monitored PUSCH resource; and
after providing the PUSCH transmission, receiving a configuration corresponding to a dedicated PUCCH resource on the BWP.

16. The method according to claim 15, wherein the SR is associated with a group corresponding to the shared PUCCH resource.

17. The method according to claim 15, further comprising:
after receiving the configuration corresponding to the dedicated PUCCH resource, transmitting further communications using the dedicated PUCCH resource.

18. The method according to claim 15, wherein the shared PUCCH resource is split in at least one of time or frequency between the UE and at least one other UE of the plurality of UEs.

19. The method according to claim 15, wherein the UE receives the assignment of the shared PUCCH resource as an initial configuration when the UE is switched to the BWP.

20. A system comprising:
a network node; and
a user equipment, UE, communicatively coupled to the network node, the user equipment configured to perform operations comprising:
receiving, from the network node, an assignment of a shared physical uplink control channel (PUCCH) resource on a bandwidth part (BWP), wherein the shared PUCCH resource is shared between a plurality of UEs;
providing a scheduling request (SR) on the shared PUCCH resource of the BWP;
receiving a grant corresponding to the SR;
providing, using the grant, a physical uplink shared channel (PUSCH) transmission on a monitored PUSCH resource; and after providing the PUSCH transmission, receiving a configuration corresponding to a dedicated PUCCH resource on the BWP.

\* \* \* \* \*